United States Patent [19]

Taylor

[11] Patent Number: 4,768,627
[45] Date of Patent: * Sep. 6, 1988

[54] FRICTIONLESS HYDRAULIC DAMPER AND DAMPER-SNUBBER

[75] Inventor: Douglas P. Taylor, N. Tonawanda, N.Y.

[73] Assignee: Tayco Developments, Inc., North Tonawanda, N.Y.

[ * ] Notice: The portion of the term of this patent subsequent to Jan. 27, 2004 has been disclaimed.

[21] Appl. No.: 6,365

[22] Filed: Jan. 23, 1987

[51] Int. Cl.$^4$ ............ F16F 9/49; F16F 5/00; F16J 9/08; F16K 41/00
[52] U.S. Cl. .................. 188/280; 188/312; 267/134; 277/177; 277/205
[58] Field of Search .......... 188/279, 280, 282, 311, 188/312, 313, 314, 318, 381, 322.17, 322.18, 322.15, 322.22, 315; 267/134; 277/170–173, 177, 205; 92/34, 37; 248/562, 636

[56] References Cited

U.S. PATENT DOCUMENTS

| | | | |
|---|---|---|---|
| 2,252,772 | 8/1941 | Katcher | 188/280 |
| 2,310,570 | 2/1943 | Briggs | 188/276 |
| 2,936,860 | 5/1960 | Peras | 188/298 |
| 2,953,810 | 9/1960 | Hall | 16/52 |
| 3,031,200 | 4/1962 | Hamer | 277/177 |
| 3,042,431 | 7/1962 | Kryzer | 277/177 X |
| 3,412,827 | 11/1968 | Brooks | 188/282 |
| 4,280,600 | 7/1981 | Salmon et al. | 188/312 |
| 4,280,741 | 7/1981 | Stoll | 277/152 X |
| 4,482,036 | 11/1984 | Wossner et al. | 188/322.17 X |
| 4,592,556 | 6/1986 | Nieman et al. | 277/152 X |
| 4,638,895 | 1/1987 | Taylor et al. | 188/280 |

FOREIGN PATENT DOCUMENTS 1144544 2/1963 Fed. Rep. of Germany ........ 188/322.17

Primary Examiner—Andres Kashnikow
Assistant Examiner—Robert J. Oberleitner
Attorney, Agent, or Firm—Joseph P. Gastel

[57] ABSTRACT

A frictionless hydraulic damper including a cylinder having end walls mounting the opposite ends of a shaft in bushings with a clearance, bellows seals between each end wall and the portions of the shaft extending beyond each end wall, a piston head on the shaft within the cylinder, hydraulic fluid in the cylinder and in both bellows seals, an orifice construction located relative to the piston head for permitting flow of hydraulic fluid past the piston head to produce damping, and a conduit in the shaft for effecting communication between the two bellows. The damper as described above also functions as a snubber by including a valve construction which selectively closes the orifice construction. The damper as described above also includes structure which effectively closes off the clearances at the relevant bushings when the piston head travels above a predetermined velocity, to thereby prevent leakage past the bushings and thus enhance the snubbing action.

20 Claims, 3 Drawing Sheets

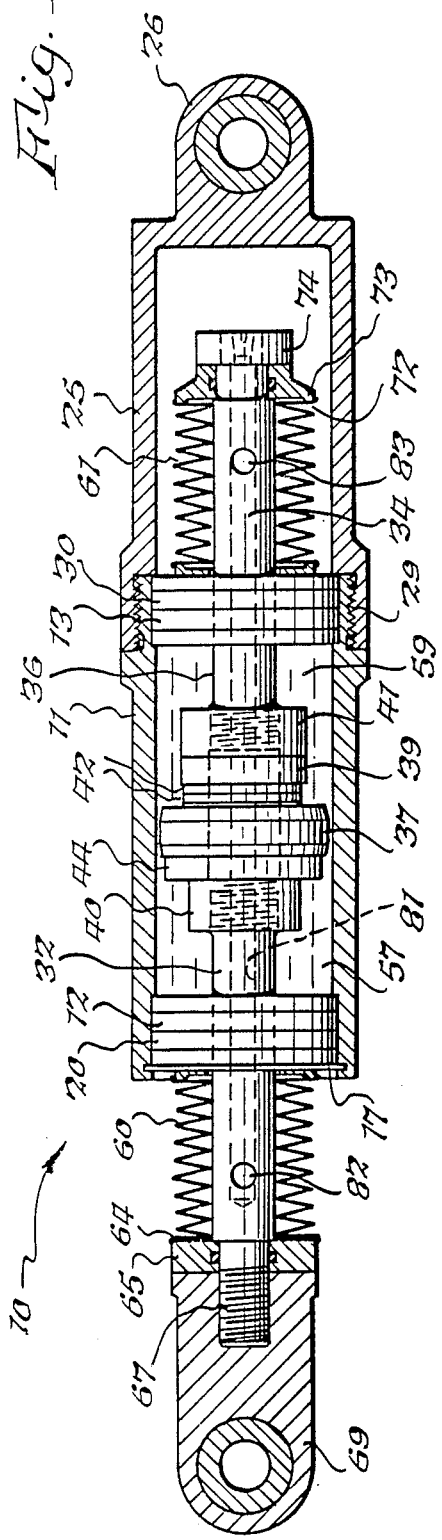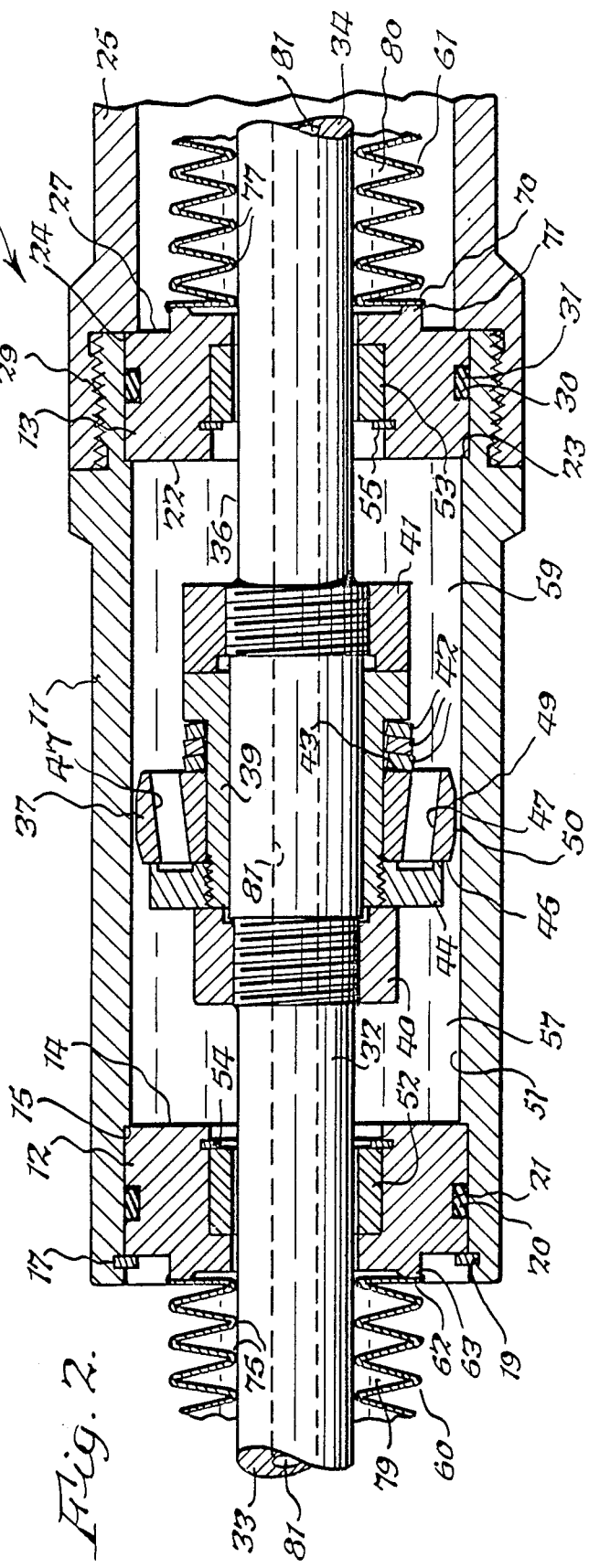

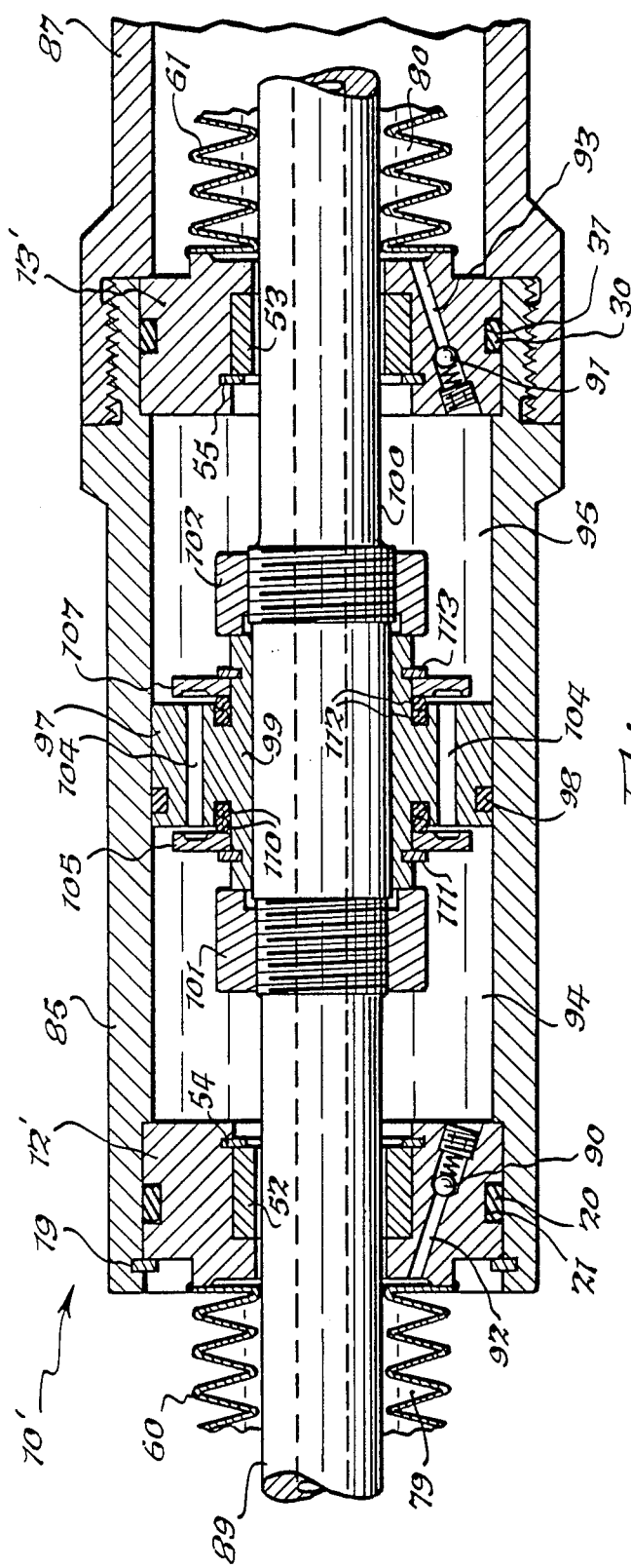
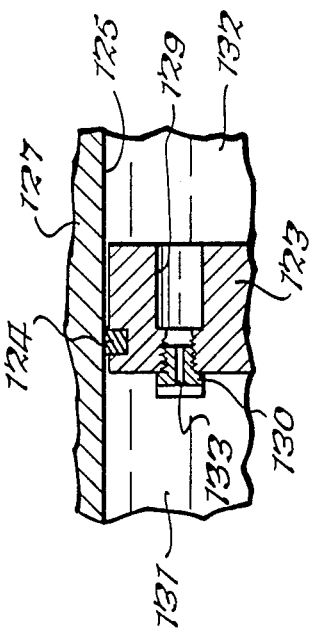
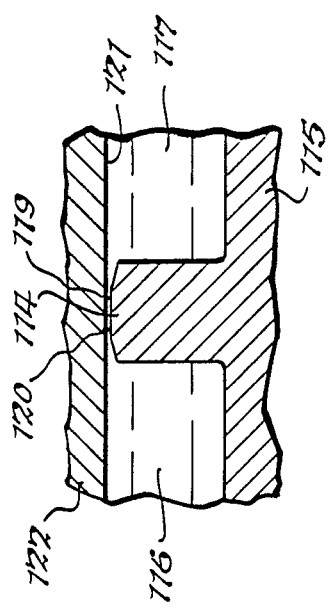

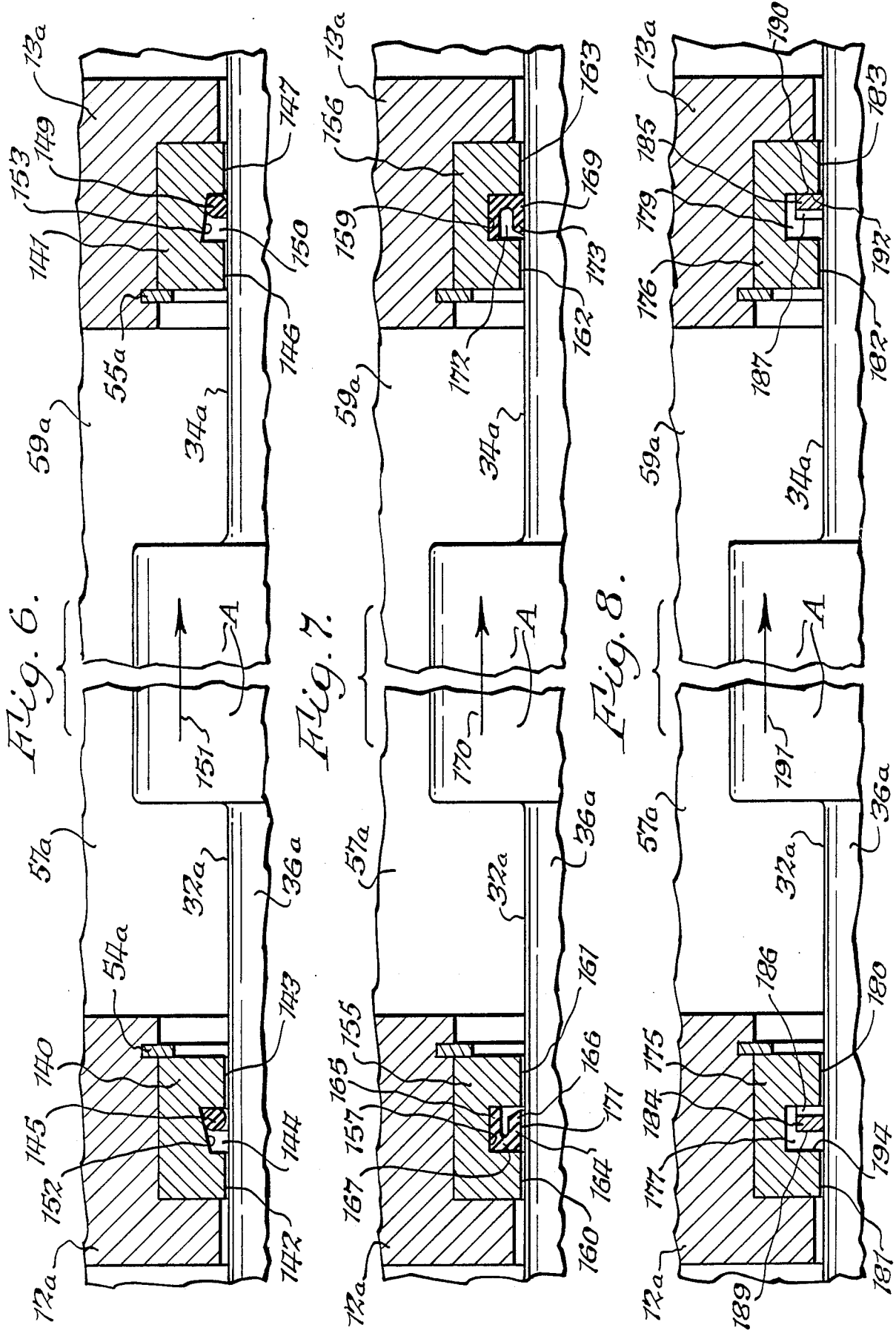

FRICTIONLESS HYDRAULIC DAMPER AND DAMPER-SNUBBER

BACKGROUND OF THE INVENTION

The present invention relates to frictionless hydraulic dampers and to frictionless hydraulic dampers which can also function as snubbers, and, more specifically, the present specification is directed to alternate embodiments of the subject matter disclosed in U.S. patent application Ser. No. 752,094, filed July 5, 1985, now U.S. Pat. No. 4,638,895, dated Jan. 27, 1987.

By way of background, frictionless hydraulic dampers are desired for certain applications to attenuate forces between relatively movable objects where the internal frictional resistance of the dampers is objectionable. There are certain hydraulic devices which function solely as dampers, and there are other hydraulic devices which function as dampers when they are subjected to forces at low velocities and also function as snubbers when they are subjected to forces at high velocities. By way of definition, a hydraulic snubber must always function as a damper when placed between relatively moving external members which move relative to each other below a predetermined velocity, and it functions as a snubber when the external members move relative to each other above the predetermined velocity.

By way of further background, and by way of specific example, in power plants and in other installations small pipes are suspended by hangers in the nature of snubbers which are subjected to forces within the 200 to 3,000 pound range. In the past it has been highly impractical to use hydraulic snubbers for this application for the following reason. The seals create friction, and where small pipes were suspended by snubbers which were subjected to forces between 200 and 500 pounds, the seal friction was a substantial portion of the applied forces which did not allow the small pipe to move in an unrestrained manner while being supported. Therefore, in the past hydraulic snubbers were not used for the foregoing application, and instead highly complex mechanical snubbers were used. These required high maintenance and many times were unreliable because of their complexity.

SUMMARY OF THE INVENTION

It is accordingly the primary object of the present invention to provide frictionless hydraulic damper constructions.

Another object of the present invention is to provide frictionless hydraulic damper constructions, which function as snubbers when the dampers experience forces which cause the piston heads therein to move above a predetermined velocity. Other objects and attendant advantages of the present invention will readily be perceived hereafter.

The present invention relates to a damper comprising a cylinder, end walls in said cylinder, a shaft, bushings in said end walls slidably mounting said shaft with clearances, end portions of said shaft extending outwardly beyond said bushings, a bellows seal mounted in fluid-tight relationship between each of said end walls and its adjacent end portion of said shaft, fluid in said cylinder and in both of said bellows, a piston head on said shaft in said cylinder, orifice means located relative to said piston head to permit flow of said fluid past said piston head, conduit means effecting communication between both of said bellows seals, first means on said shaft for attachment to a first external object, and second means on said cylinder for attachment to a second external object which is movable relative to said first external object. The present invention also relates to a damper having the above structure which can function as a snubber when it includes valve means for selectively closing said orifice means when the piston head moves above a predetermined velocity. The present invention also relates to a damper which includes structure which effectively closes off the clearance at the relevant bushing during snubbing action when the piston head travels above a predetermined velocity to thereby enhance the snubbing action.

The various aspects of the present invention will be more fully understood when the following portions of the specification are read in conjunction with the accompanying drawings wherein:

BRIEF DESCRIPTION OF THE DRAWINGS

FIG. 1 is a view, partially in cross section, of one embodiment of the improved frictionless damper of the present invention;

FIG. 2 is an enlarged fragmentary cross sectional view of a portion of the frictionless damper of FIG. 1;

FIG. 3 is an enlarged fragmentary cross sectional view of another embodiment of the present invention which is a damper with a snubbing valve;

FIG. 4 is a fragmentary cross sectional view showing a piston damper head which can comprise another embodiment of the present invention;

FIG. 5 is a fragmentary cross sectional view of a damper piston head which can comprise a still further embodiment of the present invention;

FIG. 6 is a fragmentary view, partially in cross section, of an alternate type of bushing which can be used in the snubber construction;

FIG. 7 is a fragmentary view, partially in cross section, showing a further modified bushing construction; and FIG. 8 is a fragmentary view, partially in cross section, showing yet another embodiment of a bushing construction.

DESCRIPTION OF THE PREFERRED EMBODIMENTS

The frictionless damper 10 of FIGS. 1 and 2 comprises an annular cylinder 11 having cylindrical end walls 12 and 13 mounted therein. End wall 12 includes a side 14 which has its outer edge held in abutting relationship with annular shoulder 15 by split ring 17 which is suitably retained in groove 19. An O-ring seal 20 is located in groove 21 to provide sealing against leakage. The outer annular edge of face 22 of end wall 13 abuts shoulder 23 of cylinder 11, and the shoulder 24 of cylinder extension 25 bears against the outer edge of end wall face 27 to retain it in position. An O-ring 30 is located in groove 31 to provide sealing between end wall 13 and cylinder 11. Cylinder extension 25 is threaded onto cylinder 11 at 29, and it has an attachment member 26 at its outer end for attachment to an external object.

A shaft 32 has a central portion 36 which is located in the space between end wall faces 14 and 22 and it also includes outer end portions 33 and 34 which extend varying amounts through and beyond end walls 12 and 13, respectively, depending on the position of piston head 37 which is mounted on the central portion 36 of the shaft. Piston head 37 is mounted on sleeve 39 which is held in position by nuts 40 and 41 threadably secured to the shaft. A plurality of Bellville washers 42 bear against face 43 of piston 37, and valve member 44 bears against face 45 to normally close the plurality of circumferentially located bores 47. There is a clearance space 49 between the outer periphery 50 of piston head 37 and the inner surface 51 of cylinder 11. The clearance space 49 constitutes a fluidic damping orifice of the type disclosed in U.S. Pat. No. 3,722,640.

The outer end portions 33 and 34 of shaft 32 are supported for rectilinear sliding movement in shaft supports in the nature of annular bushings 52 and 53, respectively, suitably mounted in cavities in end walls 12 and 13, respectively, and retained therein by split rings 54 and 55, respectively. There is a slight clearance between shaft portions 33 and 34 and their bushings 52 and 53, respectively, to permit shaft 32 to float substantially frictionlessly therein, and thus there can be leakage of fluid from cylinder chambers 57 and 59 on opposite sides of piston head 37 through the bushings. It will be appreciated that if O-ring seals or any other type of seals were used instead of the bushings 52 and 53 with their clearance, there could be a frictional drag on shaft 32 which could exceed approximately 2% of the rated load of the damper, and thus would be considered objectionable for many purposes. The clearance between the bushings and the shaft may be any practical amount on the order of a few thousandths of an inch.

In order to contain the above-mentioned leakage beyond bushings 52 and 53 within the cylinder 11, metal bellows seals 60 and 61 are mounted in fluid-tight relationship between end walls 12 and 13 and the portions of shaft ends 33 and 34 which extend outwardly beyond end walls 12 and 13. In this respect the annular end 62 of bellows seal 60 is secured, as by soldering or brazing, to annular lip 63 of end wall 12. The opposite annular end 64 of bellows 60 is attached as by soldering or brazing to ring 65 which is held on reduced end portion 67 of shaft 32 by attachment member 69 which connects shaft 32 to an external foreign object. The annular end portion 70 of bellows 61 is suitably attached to annular rim 71 of end wall 13 by soldering or brazing, and the opposite end 72 of bellows 61 is attached to annular member 73 by soldering or brazing. A nut 74 retains member 73 in position. The inner accordian edges 75 and 77 of bellows 60 and 61, respectively, are in substantially touching relationship with shaft portions 33 and 34, respectively, so that the bellows will remain centered relative to the shaft, that is, they will not distort as they are expanded and compressed with movement of shaft 32.

Hydraulic fluid fills the space in cylinder 11 between end walls 12 and 13 including cylinder chambers 57 and 59 on opposite sides of piston 37. Cylinder chamber 57 is in communication with bellows chamber 79 because of the leakage permitted by bushing 52. Cylinder chamber 59 is in communication with bellows chamber 80 because of the leakage permitted by bushing 53. Chambers 79 and 80 are also filled with hydraulic fluid, and thus there is a continuous body of hydraulic fluid within chambers 57, 59, 79 and 80 and the clearances at bushings 52 and 53.

In order to permit communication between bellows chambers 79 and 80, a bore 81 is provided within shaft 32. Cross ports 82 and 83 are in communication with bore 81 and are also in communication with bellows chambers 79 and 80, respectively. Normally if piston head 37 is moving below a predetermined speed, there will be a low damping force caused by flow of hydraulic fluid between cylinder chambers 57 and 59 through the orifice or clearance 49 and the leakage induced by said low damping force past bushings 52 and 53 would be practically non-existent, and there will be a flow of fluid between bellows chambers 79 and 80. More specifically, as either bellows 60 or 61 expands, the other will contract and thus fluid will be forced into the expanding bellows by the contracting bellows through the conduits 81, 82 and 83. However, if piston head 37 should move in either direction at a velocity such that substantial damping pressures exist, there may be leakage through the bushing located in the cylinder chamber which is experiencing high pressure, and this leakage will be compensated for by the communication between bellows chambers 79 and 80. More specifically, additional fluid passing through the clearance at the bushing into one bellows chamber 79 or 80 will pass through conduits 81, 82 and 83 to the other bellows chamber. At this time there will be extremely low pressure in the other cylinder chamber, and this will tend to draw fluid into it from the adjacent bellows chamber. When the damper is in a low pressure condition, and when piston head 37 is moving at a low speed, the pressure in chambers 57, 59, 80 and 81 will be substantially equal. However, when there is a substantial increase in fluid pressure in either cylinder chamber 57 or 59 due to piston head movement at high speed, the pressures in bellows chambers 80 and 81 will still be at substantially the same low value as when the piston head was moving at low speed because of the throttling effect of the clearance at the bushing through which leakage occurs. The maintaining of the low pressures in the bellows obviates their distortion and possible fracture which would otherwise occur if they were subjected to high pressures.

The specific valve 44, as shown in FIG. 2, functions in the following manner. If movement of piston head 37 to the left should exceed a predetermined velocity so that there was a pressure force on piston face 45 which was greater than the force exerted on piston face 43 by Bellville washers 42, piston head 37 will move to the right on sleeve 39 to thereby open ports 47 to permit communication therethrough between cylinder chamber 57 and cylinder chamber 59. Bellville washers 42 will return piston head 37 to the position shown in FIG. 2 wherein valve 44 closes ports 47 after the total force on piston face 45 has been reduced to a value which is lower than the spring force of the Bellville washers 42. However, there is no pressure relief if piston 37 moves to the right because there can be no unseating of valve 44 relative to bores 47. Is is to be understood that valve 44 will open only when the device functions as a damper in an overload condition when the pressure in cylinder chamber 57 exceeds a predetermined value.

In FIG. 3 a modified embodiment of the present invention is shown which is a damper-snubber in that it functions as a damper under certain conditions and functions as a snubber under other conditions. An annular cylinder 85 may be identical to annular cylinder 11 and may have a cylinder extension 87 which is identical to cylinder extension 25. It will be appreciated that an attachment member, such as 69 of FIG. 1, is mounted on the end of shaft 89. End walls 12' and 13' are analogous to end walls 12 and 13 of FIG. 1 and they contain identical elements of structure which are denoted by the identical numerals used in FIGS. 1 and 2. In addition, bellows 60 and 61 are identical to those described above relative to FIGS. 1 and 2 and further are attached to the end walls and other structure in the same manner as described above relative to FIGS. 1 and 2. However, end walls 12' and 13' differ from end walls 12 and 13, respectively, in that they contain spring biased check valves 90 and 91, respectively, which are located at the ends of conduits 92 and 93, respectively, so that under select conditions there may be communication through these conduits between each bellows chamber and its adjacent cylinder chamber. More specifically, conduit 92 and check valve 90 may permit flow from bellows chamber 79 into cylinder chamber 94. Also, conduit 93 and check valve 91 may permit flow from bellows chamber 80 into cylinder chamber 95.

A piston head 97 includes a central portion 99 which is mounted on central portion 100 of shaft 89. A low friction seal 98 is mounted on piston head 97. This seal 98 may be of the type which acts to provide sealing only when it is subjected to high fluid pressure in either of the cylinder chambers. Alternatively, seal 98 may be of the type which merely does not produce much friction, or it might be a frictionless labyrinth seal of the type shown at 52 and 53 in patent application Ser. No. 752,094, filed July 5, 1985, now U.S. Pat. No. 4,638,895, dated Jan. 27, 1987. The outer end portions of shaft 89 are supported in a frictionless manner in bushings 52 and 53 as described above relative to FIGS. 1 and 2. Nuts 101 and 102 are threaded onto the central portion 103 of shaft 89 and secure piston head 97 in position. A plurality of circumferentially placed bores 104 are located in piston head 97. Annular valve members 105 and 107 are slidably mounted on central portion 99 of piston head 97. O-rings 110 normally bias valve member away from bores 104 and against split ring 111. O-rings 112 normally bias valve member 107 away from bores 104 and against split ring 113. Alternate means, such as coil springs or equivalent structure, can be substituted for O-rings 110 and 112.

During normal movement of piston head 97 to the right or left below a predetermined velocity, there can be flow between cylinder chambers 94 and 95 through bores 104, and there should be no significant leakage through the bushings to the bellows chambers. The flow of fluid through bores 104 will create a damping action. If for any reason the velocity of piston head 97 should exceed a predetermined value, either valve 105 or 107 will block off bores 104 and thus the damper will act as a snubber because fluid will be prevented from flowing through bores 104. For example, if the velocity of piston head 97 should exceed a predetermined value as piston head 97 is moving to the right, valve member 107 will move to the left against the bias of O-rings 112 and thus close bores 104 to cause the damper to function as a snubber. Conversely, if the velocity of the piston head to the left should exceed the predetermined value, the fluid pressure will cause valve member 105 to compress O-rings 110 and move to a position wherein it closes bores 104 to thus prevent hydraulic fluid from moving from chamber 94 to chamber 95 and thus cause the damper 10' to act as a snubber. As explained above relative to FIGS. 1 and 2, any leakage of fluid past bushings 52 and 53 will enter bellows chambers 79 or 80, respectively, and since there is communication between the bellows chambers 79 and 80 through shaft bore 81 and cross bores, such as 82 and 83 (not shown in FIG. 3), the flow will be equalized.

However, there are certain situations where piston head 97 may oscillate back and forth with the valve member 105 or 107 closing bores 104. This oscillation may result in a pumping action wherein fluid may be pumped from cylinder chamber 94 into bellows chamber 79 through the clearance at bushing 52 as piston head 97 moves to the left, but as the piston head 97 moves to the right during its oscillation, there will not be enough pressure in bellows chamber 79 to force the liquid back into cylinder 94. Accordingly, as piston head 97 moves to the right, it will tend to draw a vacuum in cylinder chamber 94, or at least cause the pressure therein to be less than the pressure in bellows 79. At this time check valve 90 will open to permit flow from bellows chamber 79 into cylinder chamber 94. The same action occurs when piston head 97 oscillates slightly while moving to the right above a predetermined velocity so that the high pressure generated in chamber 95 forces liquid from cylinder chamber 95 through the clearance at bushing 53 into bellows chamber 80 during its movement to the right. However, as it moves to the left during its oscillations, the pressure in cylinder chamber 95 will fall below the pressure in bellows chamber 80 and thus check valve 91 will open to permit flow from bellows chamber 80 into cylinder chamber 95.

In FIG. 4 a further modified embodiment of the present invention is shown wherein the piston head 114 is an integral part of shaft 115, which otherwise has all of the above conduits and structure for mounting it relative to end walls, such as 12 and 13. The damping action in the embodiment of FIG. 4 is obtained in a similar manner as discussed above relative to FIGS. 1 and 2 wherein there is a flow between cylinder chambers 116 and 117, which are analogous to cylinder chambers 57 and 59, respectively, of FIG. 4, through clearance space or annular orifice 119 between the outer periphery 120 of piston head 114 and the internal surface 121 of cylinder 122. Again, except for the construction of piston head 114, the embodiment of FIG. 4 may be identical in all other respects to the structure described above in detail in FIGS. 1 and 2 or FIG. 3.

In FIG. 5 a still further further embodiment of the present invention is disclosed wherein the only difference between this embodiment and the embodiments of FIGS. 1 and 2 or FIG. 3 resides in the configuration of the piston head 123 which has a low friction seal 124 therein, as described above relative to seal 97 of FIG. 3, which provides sealing engagement with the inner surface 125 of cylinder 127. A bore 129 is provided in piston head 123 which receives a plug 130 to permit flow between cylinder chamber 131 and 132 as piston head 123 moves. The plug 130 has a bore 133 of a predetermined size through which liquid flows. By using plugs with different sized bores, the damping characteristics provided by piston head 123 may be varied.

FIGS. 6, 7 and 8 represent alternate embodiments of the present invention. It is to be understood that the only difference between these figures and FIGS. 1-5 resides in the construction of the bushing. Otherwise, the construction of FIGS. 6, 7 and 8 may be identical to the structure shown in FIGS. 1-5. More specifically by way of example, bellows, such as 60 and 61, form a part of the embodiments of FIGS. 6, 7 and 8 but are not shown in the interest of brevity. The same is true of the bore 81 and cross ports 82 and 83 of the shaft which mounts the piston. In FIG. 6, A is meant to represent any of the applicable piston heads such as 37, 97, 114 and 123 of the preceding figures. Bushings 140 and 141, which are mirror images of each other, are mounted in end walls 12a and 13a which are analogous to end walls 12 and 13 of the preceding figures. Bushings 140 and 141 are retained within end walls 12a and 13a, respectively, by split rings 54a and 55a, respectively. Bushings 140 and 141 are of annular construction and have inner surfaces. More specifically, bushing 140 has inner surfaces 142 and 143 which are located on opposite sides of annular groove 144. There are clearances on the order of a few thousandths of an inch between the outer surface 32a of shaft 36a and surfaces 142 and 143. Annular groove 144 is of the cross sectional configuration shown in FIG. 6 and an O-ring 145 is located therein. As noted above, bushing 141 is the mirror image of bushing 140 and it also has clearances between annular surfaces 146 and 147 on one hand and the outer surface 34a of shaft 36a. An O-ring 149 is located in annular groove 150, which is the mirror image of annular groove 144.

When piston rod 36a moves slowly to the right in FIG. 6, there will be flow of fluid from chamber 59a to chamber 57a past piston A as described above relative to the embodiments of FIGS. 1-5. Even if O-ring 149 should move to the position shown in FIG. 6 so as to prevent flow of fluid through clearances 146 and 147, this should not affect the damping action because of the fact that the only appreciable flow of fluid is from chamber 59a to chamber 57a past piston A. At this point it is to be noted that chambers 57a and 59a are analogous to chambers 57 and 59 of FIGS. 1 and 2. However, if piston A should move above a predetermined velocity in the cirection of arrow 151, O-ring 149, by blocking the clearance between bushing 141 and shaft portion 34a, will enhance the snubbing action which is obtained. When shaft 36a moves in the direction opposite to the direction of arrow 151, O-ring 149 will move to the left with shaft 36a into the greater volume portion of groove 150 to thus provide a necessary clearance which permits flow of fluid past bushing 141. In other words, O-ring 149 will move to a position within its groove 150 which is analogous to the position shown for O-ring 145 in groove 144.

By way of further explanation, grooves 144 and 150 have end walls 152 and 153, respectively, which are inclined as shown and it is the movement of the O-rings along these inclined surfaces which either permits the above-discussed clearance or the above-discussed closing off of the clearance. Further, in the foregoing respect, if shaft 36a should move above a predetermined velocity in a direction opposite to arrow 151, O-ring 145 will move along inclined surface 152 to a position analogous to that shown for O-ring 149 to thereby close off the clearance between bushing 140 and shaft portion 32a.

In FIG. 7 another embodiment of the present invention is disclosed. This embodiment also has a piston A which may be as described above relative to FIG. 6. In FIG. 7 end walls 12a and 13a are as described above relative to FIG. 6. Bushings 155 and 156 are located in end walls 12a and 13a, respectively. Annular grooves 157 and 159 are located in bushings 159, as shown. Annular surfaces 160 and 161 are located on opposite sides of annular groove 157 and there is a clearance between these surfaces and surface 32a of shaft 36a. Annular surfaces 162 and 163 are located on opposite sides of annular groove 159 and there are clearances between these surfaces and surface 34a of shaft 36a. The clearances are on the order of a few thousandths of an inch. An annular member 164 of the cross sectional configuration shown in FIG. 7 is located in annular groove 157, as shown. This member includes spaced legs 165 and 166 which are connected by an end portion 167. Annular member 169, which is located in groove 159, is the mirror image of annular member 164.

When piston A, as described above, moves in the direction of arrow 170 below a predetermined velocity, there will be movement of fluid from chamber 59a to chamber 57a and both members 164 and 169 will retain their normal form such as shown for member 164 wherein there is a clearance between its surface 171 and shaft surface 32a. However, if piston A should exceed a predetermined velocity in the direction of arrow 170, high pressure fluid from chamber 59a will pass through the clearance at 162 and enter the space 172 between the spaced legs of member 169 and cause lower leg 173 to move into engagement with shaft surface 34a to thereby effectively block off the clearances and thus enhance the snubbing action. After the pressure in chamber 59a is released, member 169 will return to a relaxed condition as represented by the condition of member 164 wherein leg 173 no longer engages surface 34a. Members 164 and 169 are fabricated from a suitable elastomeric material which permits them to flex in the abovedescribed manner.

When piston head A is moving in a direction opposite to arrow 170 above a predetermined velocity, surface 171 of annular member 164 will move into engagement with shaft portion 32a to thereby effectively close off the clearances and thus enhance the snubbing action. After the high pressure in chamber 57a terminates, leg 166 of member 164 will return to the position shown in FIG. 7.

Another embodiment of the present invention is shown in FIG. 8 which also includes a piston A, as described above relative to FIG. 6, mounted on a shaft 36a having end surfaces 32a and 34a. Bushings 175 and 176 are mounted in end walls 12a and 13a which are analogous to end walls 12 and 13 of FIGS. 1 and 2. Annular grooves 177 and 179 are located in bushings 175 and 176, respectively. There are clearances between annular surfaces 180 and 181 on one hand and shaft surface 32a on the other. There are also clearances between annular surfaces 182 and 183 on one hand and shaft surface 32a on the other. An annular washer-like member 184 is slidably mounted on shaft surface 32a. An annular washer-like member 185, which is the mirror image of annular member 184, is slidably mounted on shaft surface 34a. A plurality of circumferentially spaced radial grooves 186 are located in annular member 184. A plurality of circumferentially spaced radial grooves 187 are located in annular member 185. Walls 189 and 190 of annular members 184 and 185, respectively, are planar.

When shaft 36a moves in the direction of arrow 191 below a predetermined velocity, there will be movement of fluid from chamber 59a to chamber 57a past piston A. At this time planar surface 190 of member 185 will engage wall 192 of groove 179 to block flow of fluid past bushing 176. However, since the movement of shaft 36a is below a predetermined velocity, there will be no need for a snubbing action because the only flow of fluid is from chamber 59a to chamber 57a. However, if a movement of shaft 36a in the direction of arrow 191 is above a predetermined velocity, the closure of the clearance past bushing 176 because of the engagement between annular faces 190 and 192 will enhance the snubbing action. When shaft 36a is moving in the direction of arrow 191, annular member 184 will assume the position shown in FIG. 8.

When shaft 36a moves in the direction opposite to arrow 191, planar face 189 of ring member 184 will engage planar groove face 194 to effect sealing therebetween and thereby terminate communication between chamber 57a and the bellows on the opposite side of end wall 12a. As expressed above, if the movement in the direction opposite to arrow 191 is below a predetermined velocity, there will merely be a flow of fluid from chamber 57a past piston A into chamber 59a. However, if there should be a tendency to exceed the predetermined velocity, annular ring member 184 will enhance the snubbing action by effectively closing off the clearance between bushing 175 and shaft surface 32a.

In the embodiment of FIG. 8 there will be times when both annular rings 184 and 185 are positioned away from the sides of grooves 181 and 182, respectively, so that there can be communication with the bellows members on the opposite sides of end walls 12a and 13a through the clearances between the bushings and the shaft.

While the fluid discussed above was hydraulic fluid, it will be appreciated that the damper and damper-snubber can also operate with a suitable gaseous fluid.

The advantage of all of the constructions shown in FIGS. 6, 7 and 8 is that the valve-like action of the members in the bushings effectively terminates leakage through the clearances at the bushings during the snubbing action, and this enhances the snubbing action.

While preferred embodiments of the present invention have been disclosed, it will be understood that the present invention is not limited thereto but may be otherwise embodied within the scope of the following claims.

What is claimed is:

1. A damper comprising a cylinder, first and second opposite end walls in said cylinder, an elongated shaft having a central portion between said first and second end walls, first and second outer end portions on said shaft on opposite sides of said central portion, said first and second outer end portions extending through said first and second end walls, respectively, a piston head mounted on said central portion of said shaft and dividing the space in said cylinder between said first and second end walls into a first cylinder chamber proximate said first end wall and a second cylinder chamber proximate said second end wall, fluid in said first and second cylinder chambers, orifice means operatively associated with said piston head for permitting flow of fluid past said piston head between said first and second cylinder chambers during movement of said piston head, first and second bushings in said first and second end walls, respectively, for mounting said first and second outer end portions of said shaft, respectively, for sliding movement, clearances between said first and second outer end portions of said shaft and said first and second bushings, respectively, first and second fluid-tight bellows mounted in sealed relationship between said first and second outer end portions of said shaft, respectively, and said first and second end walls, respectively, on the opposite sides of said first and second end walls from said first and second cylinder chambers, respectively, for providing first and second bellows chambers, respectively, fluid in said first and second bellows chambers, first attachment means on said cylinder proximate said first bellows for attaching said cylinder to a first external object, second attachment means on said second end portion of said shaft for attaching said shaft to a second external object which is movable relative to said first external object, and conduit means interconnecting said first and second bellows chambers to permit communication therebetween.

2. A damper as set forth in claim 1 wherein said conduit means comprise bore means in said shaft.

3. A damper as set forth in claim 2 wherein said bore means comprises a first bore extending longitudinally of said shaft, a second bore extending transversely to said first bore and in communication with both said first bore and said first bellows chamber, and a third bore extending transversely to said first bore and in communication with both said first bore and said second bellows chamber.

4. A damper as set forth in claim 1 wherein said piston head includes valve means for selectively reducing flow through said orifice means when said piston head experiences a velocity above a predetermined value to thereby cause said damper to function as a snubber.

5. A damper as set forth in claim 4 wherein said orifice means comprises second bore means in said piston head, and wherein said valve means comprises a valve member, and means for movably mounting said valve member relative to said piston head.

6. A damper as set forth in claim 4 wherein said orifice means comprises second bore means in said piston head, and wherein said valve means comprises first and second valve members, and means for movably mounting said first and second valve members on opposite sides of said piston head to selectively close said second bore means in both directions of movement of said piston head.

7. A damper as set forth in claim 1 wherein said orifice means comprises a clearance space between said piston head and said cylinder.

8. A damper as set forth in claim 7 including second bore means in said piston head, and valve means for selectively opening said second bore means when the velocity of said piston head exceeds a predetermined value.

9. A damper as set forth in claim 1 including check valve means in said first end wall for permitting flow from said first bellows chamber to said first cylinder chamber when the pressure in said first bellows chamber exceeds the pressure in said first cylinder chamber by a predetermined amount.

10. A damper as set forth in claim 1 including check valve means in said second end wall for permitting flow from said second bellows chamber to said second cylinder chamber when the pressure in said second bellows chamber exceeds the pressure in said second cylinder chamber by a predetermined amount.

11. A damper as set forth in claim 10 including check valve means in said first end wall for permitting flow from said first bellows chamber to said first cylinder chamber when the pressure in said first bellows chamber exceeds the pressure in said first cylinder chamber by a predetermined amount.

12. A damper as set forth in claim 1 including means in said bushings for selectively closing off said clearances when said piston head experiences a velocity above a predetermined value to thereby cause said damper to function as a snubber.

13. A damper as set forth in claim 12 wherein said means comprises annular grooves in said bushings and O-rings in said annular grooves.

14. A damper as set forth in claim 12 wherein said means comprises at least one annular groove in one of said bushings and an O-ring in said annular groove.

15. A damper as set forth in claim 12 wherein said means comprises an annular groove in at least one of said bushings, and an annular elastomeric member in said annular groove having a side which normally has a clearance with said shaft but which engages said shaft when subjected to fluid pressure resulting from said velocity above a predetermined value.

16. A damper as set forth in claim 12 wherein said means comprises an annular groove in at least one of said bushings, a ring slidable on said shaft and located within said annular groove, a first side wall on the side of said groove remote from said piston head, a second side wall on said ring for sealing engagement with said first side wall, and groove means on the opposite side of said ring from said second side wall for permitting fluid to pass therethrough.

17. A damper as set forth in claim 16 wherein said groove means comprises a plurality of circumferentially spaced radial slots.

18. A damper-snubber comprising a cylinder, end walls in said cylinder, a shaft, bushings in said end walls, portions of said shaft in said bushings, end portions of said shaft extending outwardly beyond said bushings, clearances between said portions of said shaft and said bushings, a bellows seal mounted in fluid-tight relationship between each of said end walls and its adjacent end portion of said shaft, fluid in said cylinder and in both of said bellows, a piston head on said shaft in said cylinder, means in said end walls to permit flow of fluid through said clearances when said piston head moves below a predetermined velocity to thereby cause said damper-snubber to function as a damper, conduit means effecting communication between both of said bellows seals, first means on said shaft for attachment to a first external object, second means on said cylinder for attachment to a second external object which is movable relative to said first external object, and means for selectively closing said clearances when said piston head moves above said predetermined velocity to cause said damper-snubber to function as a snubber.

19. A damper-snubber as set forth in claim 18 wherein said conduit means comprises bore means in said shaft.

20. A fluid damper comprising a cylinder, first and second end walls in said cylinder, piston means in said cylinder including a piston head and a piston shaft including first and second shaft portions extending outwardly from said piston head beyond said first and second end walls, respectively, first and second sides on said piston head, said piston head dividing said cylinder into a first chamber between said first side and said first end wall and into a second chamber between said second side and said second end wall, means in said first and second end walls for guiding said piston means for substantially frictionless rectilinear movement relative to said cylinder, a first bellows effectively extending in fluid-tight engagement between said first shaft portion and said first end wall, a second bellows effectively extending in fluid-tight engagement between said second shaft portion and said second end wall, fluid in said first and second chambers said piston means, means for effecting communication between said first and second bellows to thereby permit passage of said fluid therebetween, and orifice means operatively associated with said piston head for permitting flow of fluid between said first and second chambers in response to movement of said piston head toward and away from said first and second end walls.

* * * * *

UNITED STATES PATENT AND TRADEMARK OFFICE
CERTIFICATE OF CORRECTION

PATENT NO. : 4,768,627

DATED : September 6, 1988

INVENTOR(S) : Douglas P. Taylor

It is certified that error appears in the above-identified patent and that said Letters Patent is hereby corrected as shown below:

Column 7, line 30, change "cirection" to --direction--.

Column 9, line 53 (claim 1), change "secohd" to --second--.

Column 11, lines 28-29 (claim 18), change "relatiqnship" to --relationship--.

Column 12, line 28 (claim 20), after "chambers" insert --in communication with said first and second bellows, respectively, through said means in said first and second end walls for guiding--.

Signed and Sealed this

Tenth Day of January, 1989

Attest:

DONALD J. QUIGG

*Attesting Officer*     *Commissioner of Patents and Trademarks*